E. HILL, Jr.
Linings for Cylinders.
No. 158,587.  Patented Jan. 12, 1875.
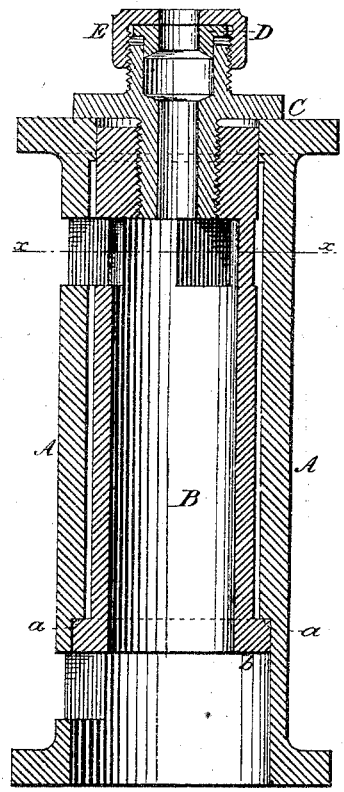
FIG. I.
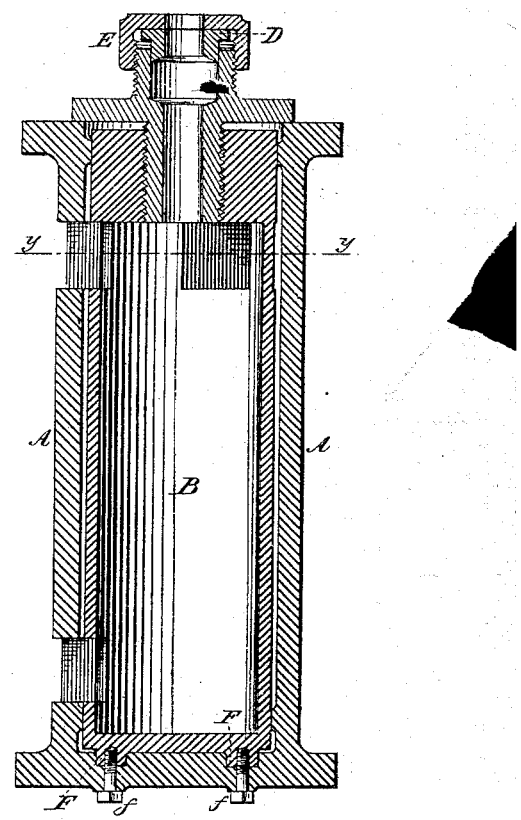
FIG. III.
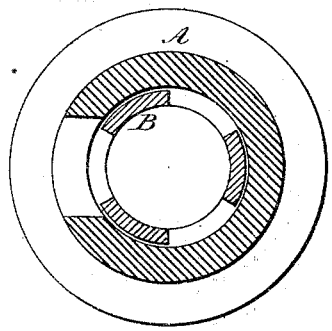
FIG. II.
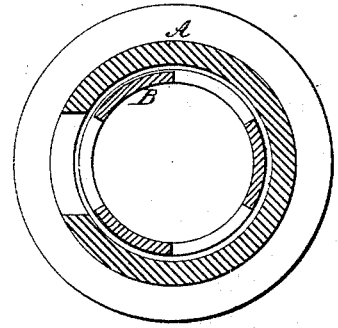
FIG. IV.
WITNESSES:
Oscar T. Earle
P. H. Disbrow
INVENTOR:
Ebenezer Hill, Junior

UNITED STATES PATENT OFFICE.

EBENEZER HILL, JR., OF SOUTH NORWALK, CONNECTICUT.

IMPROVEMENT IN LININGS FOR CYLINDERS.

Specification forming part of Letters Patent No. 158,587, dated January 12, 1875; application filed October 19, 1874.

*To all whom it may concern:*

Be it known that I, EBENEZER HILL, Jr., of South Norwalk, in the county of Fairfield and State of Connecticut, have invented certain new and useful Improvements in Bushing or Lining of Composition for Water, Air, or Steam Cylinders; and I do hereby declare the following to be a full, clear, and exact description of the invention, such as will enable others skilled in the art to which it pertains to make and use it, reference being had to the accompanying drawings which form part of this specification.

In the drawing, Figure 1 represents a longitudinal section of a cylinder with the lining and stuffing-box. Fig. 2 is a cross-section on line $x\,x$ of Fig. 1. Fig. 3 represents a modification of the same. Fig. 4 is a cross-section on line $y\,y$ of Fig. 3.

The object of my invention is to furnish a bushing or lining of composition or other suitable material for steam, air, and water-cylinders, pipes, &c., that can be easily secured in position, and readily and quickly removed or replaced when it is to be rebored, or has been worn out, or become injured in any manner; and it consists of a bushing or lining held and secured in its position by means of the stuffing-box, which is screwed into one end of said lining, while the other end is either held by a flange, which engages with an offset or projection in the cylinder, or is secured by bolts to the head or bonnet, or in any other suitable manner.

The usual method of lining cylinders is to bore and turn and fit the bushing, and then force it in by screw-power, which is also costly and slow.

In the drawing, A represents an outer cylinder of cast-iron or other suitable material, with the usual flanges and ports, and is provided with a recess or projection, $a$, against which the flanges $b$ of the lining B abut. At the other end of said lining is a box, C, provided at its inner end with a male screw-thread that engages with a female thread in the lining, and thus holds it in place. The usual gland D and follower E are arranged on the outer end of the stuffing-box, and serve to pack the piston or pump rod in the usual manner. In very long cylinders one or more chipping or bearing pieces may be cast on the inside of the outer cylinder, as a small space is left between the side of the cylinders, which allows for expansion and contraction of the different metals, and also obviates the necessity of boring, turning, and fitting the cylinders their entire length.

In the modification shown in Figs. 3 and 4, which is intended more particularly for vertical cylinders, or in those which have one head cast on, the lining B is secured at one end by tap-bolts $f\,f$, which are screwed into bosses F on the end of the lining, and which fit into recesses in the head or bonnet. The other end is then secured by the stuffing-box, as in the above case.

It will be obvious to all acquainted with the art, that this furnishes a bushing or lining which can be readily and easily removed, when it is desired to repair or rebore it, or that it can be replaced by a new one, if worn out, without injury to the outer cylinder, and with less trouble and expense than the usual kind.

I wish it understood that I do not confine myself to the exact construction or arrangement of the parts herein described, as many modifications of the same may suggest themselves; but What I do claim, and desire to secure by Letters Patent, is—

The combination of a lining, B, having a flange, $b$, and a stuffing-box, C, provided with a screw-thread to secure the lining in a cylinder, A, when constructed substantially as shown, and for the purpose specified.

In testimony that I claim the foregoing I have hereunto set my hand this 20th day of August, 1874.

EBENEZER HILL, JR.

Witnesses:
OSCAR T. EARLE,
P. H. DISBROW.